(12) United States Patent
Veltri et al.

(10) Patent No.: US 9,083,207 B1
(45) Date of Patent: Jul. 14, 2015

(54) HIGH-VOLTAGE FLYWHEEL ENERGY STORAGE SYSTEM

(71) Applicant: TEMPORAL POWER LTD., Mississauga (CA)

(72) Inventors: Jeffrey A. Veltri, Burlington (CA); Cody J. MacNeil, Toronto (CA)

(73) Assignee: Temporal Power Ltd., Mississauga, Ontario (CA)

( * ) Notice: Subject to any disclaimer, the term of this patent is extended or adjusted under 35 U.S.C. 154(b) by 0 days.

(21) Appl. No.: 14/152,721

(22) Filed: Jan. 10, 2014

(51) Int. Cl.
*H02K 7/02* (2006.01)
*H02K 7/09* (2006.01)

(52) U.S. Cl.
CPC . *H02K 7/025* (2013.01); *H02K 7/09* (2013.01)

(58) Field of Classification Search
CPC .................................. H02K 7/025; H02K 7/09
USPC ....................................................... 310/74, 43
See application file for complete search history.

(56) References Cited

U.S. PATENT DOCUMENTS

| | | |
|---|---|---|
| 2,894,155 A | 7/1959 | Labastie |
| 3,514,625 A | 5/1970 | Lane |
| 3,665,495 A | 5/1972 | Carter et al. |
| 3,667,012 A | 5/1972 | Kilgore |
| 4,001,666 A | 1/1977 | Grenfell |
| 4,221,452 A | 9/1980 | Remington |
| 4,223,240 A | 9/1980 | Theyse |
| 4,434,393 A | 2/1984 | Kobari et al. |
| 4,511,190 A | 4/1985 | Caye et al. |
| 4,563,046 A | 1/1986 | Shimamoto |
| 4,566,740 A | 1/1986 | Beau et al. |
| 4,620,272 A | 10/1986 | Fulton et al. |
| 4,700,094 A | 10/1987 | Downer et al. |
| 4,723,735 A | 2/1988 | Eisenhaure et al. |
| 4,785,212 A | 11/1988 | Downer et al. |
| 5,057,697 A | 10/1991 | Hammond et al. |
| 5,124,605 A | 6/1992 | Bitterly et al. |
| 5,126,610 A | 6/1992 | Fremerey |
| 5,250,865 A | 10/1993 | Meeks |
| 5,329,222 A | 7/1994 | Gyugyi et al. |
| 5,449,989 A | 9/1995 | Correa et al. |
| 5,541,460 A | 7/1996 | Dunfield et al. |
| 5,614,777 A | 3/1997 | Bitterly et al. |

(Continued)

FOREIGN PATENT DOCUMENTS

| | | |
|---|---|---|
| AU | 2004305778 A1 | 3/2005 |
| AU | 2011200041 A1 | 1/2011 |

(Continued)

OTHER PUBLICATIONS

Aditiya, S.K. et al.,"Battery energy storage for load frequency control of an interconnected power system," Electric Power Systems Research 58, pp. 179-185, Feb. 2001.

(Continued)

*Primary Examiner* — Hanh Nguyen
(74) *Attorney, Agent, or Firm* — Sterne, Kessler, Goldstein & Fox P.L.L.C.

(57) ABSTRACT

A high-voltage flywheel energy storage system to prevent ionization, plasma formation, and electrical arc discharge and corresponding method are provided. The high-voltage flywheel energy storage system prevents ionization, plasma formation, and electrical arc discharge by isolating the motor windings and motor end windings from the partial vacuum environment existing in the flywheel housing.

8 Claims, 6 Drawing Sheets

(56) References Cited

U.S. PATENT DOCUMENTS

| | | |
|---|---|---|
| 5,619,083 A | 4/1997 | Dunfield et al. |
| 5,635,770 A | 6/1997 | Evans, Jr. et al. |
| 5,699,666 A | 12/1997 | Kurten et al. |
| 5,708,312 A | 1/1998 | Rosen et al. |
| 5,759,589 A | 6/1998 | George, Jr. |
| 5,760,506 A | 6/1998 | Ahlstrom et al. |
| 5,763,971 A | 6/1998 | Takahata et al. |
| 5,780,980 A | 7/1998 | Naito |
| 5,798,633 A | 8/1998 | Larsen et al. |
| 5,821,651 A | 10/1998 | Lansberry et al. |
| 5,847,480 A | 12/1998 | Post |
| 5,855,055 A | 1/1999 | Boudreau et al. |
| 5,894,181 A | 4/1999 | Imlach |
| 5,912,519 A | 6/1999 | Horner et al. |
| 5,917,251 A | 6/1999 | Schermann et al. |
| 5,920,138 A | 7/1999 | Clifton et al. |
| 5,921,505 A | 7/1999 | Spector |
| 5,932,935 A | 8/1999 | Clifton et al. |
| 5,939,102 A | 8/1999 | George, Jr. |
| 5,942,825 A | 8/1999 | Lee |
| 5,945,754 A | 8/1999 | Fulwood et al. |
| 5,969,457 A | 10/1999 | Clifton et al. |
| 5,994,794 A | 11/1999 | Wehrlen |
| 5,998,899 A | 12/1999 | Rosen et al. |
| 6,019,319 A | 2/2000 | Falbel |
| 6,023,152 A | 2/2000 | Briest et al. |
| 6,134,124 A | 10/2000 | Jungreis et al. |
| 6,144,128 A | 11/2000 | Rosen |
| 6,166,472 A | 12/2000 | Pinkerton et al. |
| 6,169,390 B1 | 1/2001 | Jungreis |
| 6,175,166 B1 | 1/2001 | Bapat |
| 6,215,202 B1 | 4/2001 | Luongo et al. |
| 6,227,817 B1 | 5/2001 | Paden |
| 6,231,011 B1 | 5/2001 | Chu et al. |
| 6,262,505 B1 | 7/2001 | Hockney et al. |
| 6,268,674 B1 | 7/2001 | Takahashi |
| 6,304,015 B1 | 10/2001 | Filatov et al. |
| 6,347,925 B1 | 2/2002 | Woodard et al. |
| 6,388,347 B1 | 5/2002 | Blake et al. |
| 6,441,581 B1 | 8/2002 | King et al. |
| 6,448,679 B1 | 9/2002 | Imlach |
| 6,464,472 B1 | 10/2002 | Sekiguchi et al. |
| 6,522,031 B2 | 2/2003 | Provanzana et al. |
| 6,566,775 B1 | 5/2003 | Fradella |
| 6,570,286 B1 | 5/2003 | Gabrys |
| 6,583,528 B2 | 6/2003 | Gabrys |
| 6,585,490 B1 | 7/2003 | Gabrys et al. |
| 6,614,132 B2 | 9/2003 | Hockney et al. |
| 6,624,532 B1 | 9/2003 | Davidow et al. |
| 6,624,542 B1 | 9/2003 | Gabrys et al. |
| 6,630,761 B1 | 10/2003 | Gabrys |
| 6,664,680 B1 | 12/2003 | Gabrys |
| 6,675,872 B2 | 1/2004 | Lewis et al. |
| 6,700,258 B2 | 3/2004 | McMullen et al. |
| 6,703,735 B1 | 3/2004 | Gabrys |
| 6,710,489 B1 | 3/2004 | Gabrys |
| 6,727,617 B2 | 4/2004 | McMullen et al. |
| 6,737,762 B2 | 5/2004 | Koenig |
| 6,741,007 B2 | 5/2004 | Frash et al. |
| 6,747,378 B2 | 6/2004 | Brackett |
| 6,798,092 B1* | 9/2004 | Gabrys et al. .................. 310/45 |
| 6,806,605 B1 | 10/2004 | Gabrys |
| 6,817,266 B1 | 11/2004 | Brackett |
| 6,824,861 B2 | 11/2004 | Spears |
| 6,825,588 B2 | 11/2004 | Gabrys et al. |
| 6,852,401 B2 | 2/2005 | Spears et al. |
| 6,882,072 B2 | 4/2005 | Wingett et al. |
| 6,882,904 B1 | 4/2005 | Petrie et al. |
| 6,884,039 B2 | 4/2005 | Woodard et al. |
| 6,897,587 B1 | 5/2005 | McMullen et al. |
| 6,914,349 B2 | 7/2005 | Rajagopalan |
| 6,959,756 B2 | 11/2005 | Woodard et al. |
| 6,980,891 B2 | 12/2005 | Nagafuchi et al. |
| 6,995,529 B2 | 2/2006 | Sibley |
| 7,034,420 B2 | 4/2006 | Brackett et al. |
| 7,052,253 B2 | 5/2006 | Izraelev |
| 7,053,589 B2 | 5/2006 | Gabrys et al. |
| 7,071,581 B2 | 7/2006 | Eisenhaure et al. |
| 7,174,806 B2 | 2/2007 | Brackett et al. |
| 7,197,958 B2 | 4/2007 | Brault et al. |
| 7,343,361 B2 | 3/2008 | Peljto et al. |
| 7,358,620 B2 | 4/2008 | Melfi |
| 7,365,461 B2 | 4/2008 | Brackett et al. |
| 7,416,039 B1 | 8/2008 | Anderson et al. |
| 7,566,990 B2 | 7/2009 | Loucks et al. |
| 7,679,245 B2 | 3/2010 | Brackett et al. |
| 7,679,247 B2 | 3/2010 | Wang |
| 7,715,951 B2 | 5/2010 | Forbes, Jr. et al. |
| 7,786,616 B2 | 8/2010 | Naden et al. |
| 7,830,055 B2 | 11/2010 | Arseneaux et al. |
| 7,834,479 B2 | 11/2010 | Capp et al. |
| 7,847,423 B1 | 12/2010 | Farkas |
| 8,008,804 B2 | 8/2011 | Capp et al. |
| 8,030,787 B2 | 10/2011 | Kalev |
| 8,102,144 B2 | 1/2012 | Capp et al. |
| 8,242,649 B2* | 8/2012 | Fradella ........................ 310/74 |
| 8,314,527 B2* | 11/2012 | Wang ........................ 310/90.5 |
| 8,343,603 B2 | 1/2013 | Negle |
| 8,669,675 B2 | 3/2014 | Capp et al. |
| 2002/0041126 A1 | 4/2002 | Provanzana et al. |
| 2003/0010037 A1 | 1/2003 | Vugdelija |
| 2003/0155831 A1 | 8/2003 | Gabrys et al. |
| 2003/0160595 A1 | 8/2003 | Provanzana et al. |
| 2003/0225483 A1 | 12/2003 | Santinato et al. |
| 2004/0051507 A1* | 3/2004 | Gabrys et al. ..................... 322/4 |
| 2004/0126635 A1 | 7/2004 | Pearson |
| 2004/0135436 A1 | 7/2004 | Gilbreth et al. |
| 2004/0150374 A1 | 8/2004 | Kraus |
| 2005/0035744 A1 | 2/2005 | Potter et al. |
| 2005/0150323 A1 | 7/2005 | Spears |
| 2007/0014980 A1 | 1/2007 | Spears |
| 2007/0103009 A1 | 5/2007 | Yang |
| 2008/0315696 A1 | 12/2008 | Wang |
| 2010/0237629 A1 | 9/2010 | Gray |
| 2010/0264759 A1 | 10/2010 | Shafer et al. |
| 2011/0175371 A1 | 7/2011 | Gray |
| 2011/0278853 A1 | 11/2011 | Capp et al. |
| 2011/0298293 A1 | 12/2011 | Veltri |
| 2012/0056483 A1 | 3/2012 | Capp et al. |
| 2012/0065805 A1 | 3/2012 | Montalvo |
| 2013/0002064 A1 | 1/2013 | De Bock et al. |
| 2013/0043750 A1* | 2/2013 | Wang ............................. 310/74 |
| 2013/0270914 A1 | 10/2013 | Veltri |

FOREIGN PATENT DOCUMENTS

| | | |
|---|---|---|
| BR | PI 0413598-9 A | 10/2006 |
| CA | 2 535 458 A1 | 3/2005 |
| CA | 2 801 307 A1 | 12/2011 |
| CA | 2 813 020 A1 | 10/2013 |
| CN | 103038541 A | 4/2013 |
| EP | 0 235 555 B1 | 5/1992 |
| EP | 0 291 742 B1 | 2/1993 |
| EP | 0 872 942 A2 | 10/1998 |
| EP | 1 271 741 A2 | 1/2003 |
| EP | 1 394 928 A3 | 9/2004 |
| EP | 1 171 946 B1 | 8/2006 |
| EP | 1 275 822 B1 | 5/2009 |
| EP | 2 330 726 A2 | 6/2011 |
| JP | 6-284583 A | 10/1994 |
| JP | 2000-14013 A | 1/2000 |
| JP | 2007-503191 A | 2/2007 |
| JP | 2013-531452 A | 8/2013 |
| KR | 10-2013-0121703 A | 11/2013 |
| MX | 2012014398 A | 6/2013 |
| WO | WO 98/43341 A1 | 10/1998 |
| WO | WO 99/13553 A1 | 3/1999 |
| WO | WO 99/50945 A1 | 10/1999 |
| WO | WO 01/17092 A1 | 3/2001 |
| WO | WO 02/03523 A2 | 1/2002 |
| WO | WO 02/097945 A2 | 12/2002 |
| WO | WO 02/103879 A1 | 12/2002 |
| WO | WO 03/023224 A1 | 3/2003 |
| WO | WO 2005/029667 A2 | 3/2005 |

(56) References Cited

FOREIGN PATENT DOCUMENTS

| WO | WO 2011/090511 A2 | 7/2011 |
|---|---|---|
| WO | WO 2011/153612 A2 | 12/2011 |
| WO | WO 2013/096946 A1 | 6/2013 |
| WO | WO 2013/155598 A1 | 10/2013 |

OTHER PUBLICATIONS

Akagi, H., "Active filters and energy storage systems operated under non-periodic conditions," Power Engineering Society Summer Meeting, 2000, IEEE, vol. 2, 16-20, pp. 965-970, Jul. 2000.

Akhil, A. et al., "Cost Analysis of Energy Storage Systems for Electric Utility Applications," Sandia National Laboratories, 62 pages, Feb. 1997.

Athay, T.M., "Generation Scheduling and Control," Proceedings of the IEEE, vol. 75, No. 12, pp. 1592-1606, Dec. 1987.

Bender, D. A. et al., "DC Power Management with a High Performance Flywheel," AFS Trinity Power Corporation, EESAT 2002 Conference, 4 pages, Apr. 2002.

Bender, D. A. et al., "DC Power Management with a High Performance Flywheel," presentation, AFS Trinity Power Corporation, EESAT 2002 Conference, 12 pages, Apr. 2002.

Bhatnager, D. et al., "Market and Policy Barriers to Energy Storage Deployment," Sandia National Laboratories, 58 pages, Sep. 2013.

Bornemann, H.J. et al., "Conceptual system design of a 5 MWh/100 MW superconducting flywheel energy storage plant for power utility applications," IEEE Transactions on Applied Superconductivity, vol. 7, Issue 2, Part 1, pp. 398-401, Jun. 1997.

Bose, A. et al., "Impact of New Energy Technologies on Generation Scheduling," IEEE Transactions on Power Apparatus and Systems, vol. PAS-103, No. 1, pp. 66-71, Jan. 1984.

Butler, P., et al., "Energy Storage Opportunities Analysis Phase II Final Report A Study for the DOE Energy Storage Systems Program," Sandia National Laboratories, 60 pages, May 2002.

Butler, P.C., "Battery Energy Storage for Utility Applcations: Phase I—Opportunities Analysis," Sandia National Laboratories, 69 pages, Oct. 1994.

Canadian Office Action for Application No. CA 2,535,458, dated Jan. 27, 2014.

"Chino Battery Energy Storage Power Plant: First Year of Operation," Bechtel Group, Inc., 236 pages, Dec. 1992.

Cook, G.M. et al., "Overview of Battery Regulation and Storage," IEEE Transactions on Energy Conversion, vol. 6, No. 1, pp. 204-211, Mar. 1991.

Day, A.C. et al., "Flywheels With All-Passive, Non-Contact Magnetic Suspensions," presentation, Boeing Phantom Works, EESAT 2002 Conference, 18 pages, Apr. 2002.

Day, A.C. et al., "Flywheels With All-Passive, Non-Contact Magnetic Suspensions," Boeing, EESAT 2002 Conference, 6 pages, Apr. 2002.

European Search Report Issued in European Application No. 04809577.2, 3 pages, dated Feb. 22, 2012.

Gordon, S.P. et al., eds., "The Emerging Roles of Energy Storage in a Competitive Power Market: Summary of a DOE Workshop," Sandia National Laboratories, 78 pages, Jun. 1995.

Hampton, D. E. et al., "Emergency control of power system frequency using fly wheel energy injection," Advances in Power System Control, Operation and Management, APSCOM-91, pp. 662-666, Nov. 1991.

Hearn, C.S. et al., "Low cost Flywheel Energy Storage for a Fuel Cell Powered Transit Bus," Vehicle Power and Population Conference, 8 pages, Sep. 9-12, 2007.

Hebner, R. et al., "Flywheel Batteries Come Around Again," IEEE Spectrum, pp. 46-51, Apr. 2002.

Higgins, M.A. et al., "Flywheel Energy Storage for Electric Utility Load Leveling" Proc. of the 26th Intersociety Energy Conversion Engineering Conference, vol. 4, pp. 209-214, Aug. 1991.

Hockney, R. et al., "Powering of Remote Node Locations Using Flywheel Energy Storage," IEEE, 18th International Telecommunications Energy Conference, pp. 662-667, Oct. 1996.

Hockney, R. et al., "Powering of Standby Power Supplies Using Flywheel Energy Storage," IEEE, pp. 105-109, 1997.

International Search Report and Written Opinion of the International Searching Authority for International Application No. PCT/CA2013/000359, 9 pages, mailed on Aug. 29, 2013.

International Search Report and Written Opinion of the International Searching Authority for International Application No. PCT/CA2013/050840, 8 pages, mailed on Jan. 30, 2014.

International Search Report for Application No. PCT/US04/26721, 2 pages, mailed Nov. 1, 2005.

International Search Report from PCT Application No. PCT/CA2011/000641, 2 pages, mailed Oct. 4, 2011.

Jiancheng, Z., et al., "Research on Flywheel Energy Storage System for Power Quality," IEEE, pp. 496-499, 2002.

Kirby, B.J., "Frequency Regulation Basics and Trends," Oak Ridge National Laboratory, U.S. Department of Energy, 32 pages, Dec. 2004.

Kottick, D. et al., "Battery Energy Storage for Frequency Regulation in an Island Power System," IEEE Transactions on Energy Conversion, vol. 8, No. 3, pp. 455-459, Sep. 1993.

Kunisch, H.J. et al., "Battery Energy Storage: Another Option for Load-Frequency-Cortrol and Instantaneous Reserve," IEEE Transactions on Energy Conversion, vol. EC-1, No. 3, pp. 41-46, Sep. 1986.

Lazarewicz, M., "A Description of the Beacon Power High Energy and High Power Composite Flywheel Energy Storage System," presentation, EESAT 2002 Conference, 23 pages, Apr. 2002.

Lazarewicz, M., "A Description of the Beacon Power High Energy and High Power Composite Flywheel Energy Storage Systems," EESAT 2002 Conference, 6 pages, Apr. 2002.

Lazarewicz, M.L. et al., "Grid Frequency Regulation by Recycling Electrical Energy in Flywheels," Beacon Power, 5 pages, 2004.

Lazarewicz, M.L. et al., "Status of Pilot Projects Using Flywheels for Frequency Regulation," IEEE, 3 pages, 2006.

Lu, C.F. et al., "Effect of Battery Energy Storage System on Load Frequency Control Considering Governor Deadband and Generation Rate Constraint," IEEE Transactions on Energy Conversion, vol. 10, No. 3, pp. 555-561, Sep. 1995.

Lyons, P., "Energy Storage for Power Systems with Rapidly Changing Loads," pp. 1-112, Purdue University, available at http://docs.lib.purdue.edu/cgi!viewcontent.cgi?article=1266&context=ecetr, Dec. 2002.

Mack, D.R., "Something new in power technology," IEEE Potentials, pp. 40-42, Apr. 1993.

Makansi, J. et al., "Energy Storage: The Missing Link in the Electricity Value Chain," Energy Storage Council, 23 pages, May 2002.

McElligott, S., "Flywheels Set to Help Regulate Frequency on the U.S. Grid," TechSurveillance Magazine, Cooperative Research Network, 7 pages, Nov. 2010.

Mrugowsky, H. et al., "Investigation of the stability of a 600 MJ energy storage system based on paralleled flywheel generators," presentation, EESAT 2002 Conference, 25 pages, Apr. 2002.

Park, J.D., "Simple Flywheel Energy Storage using Squirrel-Cage Induction Machine for DC Bus Microgrid Systems," IECON 2010—36th Annual Conference on IEEE Industrial Electronics Society, pp. 3040-3045, Nov. 2010.

Rabenhorst, D.W. et al., "Low-Cost Flywheel Demonstration Program," The Johns Hopkins University, Applied Physics Laboratory, 108 pages, Apr. 1980.

Ribeiro, P.F. et al., "Energy Storage Systems for Advanced Power Applications," Proceedings of the IEEE, vol. 89, No. 12, pp. 1744-1756, Dec. 2001.

Richey, S., "Cleansource2 Battery-Free Energy Storage Theory of Operation," Active Power, EESAT 2002 Conference, 5 pages, 2002.

Richey, S., "Cleansorce2 Battery-Free Energy Storage Theory of Operation," presentation, Active Power, EESAT 2002 Conference, 22 pages, 2002.

Rojas, A., "Flywheel Energy Matrix Systems—Today's Technology, Tomorrow's Energy Storage Solution," Beacon Power Corp, 10 pages, 2003.

Sasaki, T. et al., "Study on Load Frequency Control Using Flow Batteries," IEEE Transactions on Power Systems, vol. 19, No. 1, pp. 660-667, Feb. 2004.

(56) References Cited

OTHER PUBLICATIONS

Sears, J.R., "TEX: The Next Generation of Energy Storage Technology," IEEE, 11-3, pp. 218-222, 2004.
Sen, U., "Battery Energy Storage for Load Frequency Control of an Interconnected Power System," Delhi Technological University, 73 pages, Jun. 2011.
Symons, P.C., "Opportunities for Energy Storage in Stressed Electricity Supply Systems," IEEE, pp. 448-449, 2001.
Tarrant, C., "Revolutionary flywheel energy storage system for quality power," Power Engineering Journal, pp. 159-163, Jun. 1999.
Townley, D., "Introducing Pentadyne Power Flywheel Energy Storage System," Pentadyne Power Corporation, EESAT 2002 Conference, 4 pages, Apr. 2002.
Townley, D., "Performance and Application of the Pentadyne Flywheel System," presentation, Pentadyne Power Corporation, EESAT 2002 Conference, 24 pages, Apr. 2002.
"Ultra-Sealed Winding," Dreisilker Electric Motors, Inc., accessed at www.dreisilker.com/static.asp?path=2980, accessed on Jul. 4, 2013, 2 pages, 2013.
Van Der Linden, S., "The Commercial World of Energy Storage: A Review of Operating Facilities," presentation, 1st Annual Conference of the Energy Storage Council, 51 pages, Mar. 2003.
Wagner, R. et al., "Flywheel Technology Development At The NASA Glenn Research Center," University of Toledo, NASA Glenn Research Center, EESAT 2002 Conference, 6 pages, Apr. 2002.
Wagner, R. et al., "Flywheel Technology Development At The NASA Glenn Research Center," presentation, University of Toledo, NASA Glenn Research Center, EESAT 2002 Conference, 17 pages, Apr. 2002.
Zarzour, M. et al., "Experimental Evaluation of a Metal Mesh Bearing Damper," Transactions of the ASME, vol. 122, pp. 326-329, Apr. 2000.
English Language Abstract of Japanese Patent Publication No. 06-284583 A, Japanese Patent Office, Patent Abstract of Japan, Oct. 1994 (listed as document FP3 on the accompanying form PTO/SB/08A).
English Language Abstract of Japanese Patent Publication No. 2000-014013 A, Japanese Patent Office, Patent Abstracts of Japan, Jan. 2000 (listed as document FP8 on the accompanying form PTO/SB/08A).

* cited by examiner

HIGH-VOLTAGE FLYWHEEL ENERGY STORAGE SYSTEM

BACKGROUND

1. Field

Embodiments of the present invention relate to energy storage systems. In particular, high-voltage flywheel energy storage systems store electrical energy as kinetic energy in a rotating flywheel. The stored energy can also be released from the high-voltage flywheel energy storage system.

2. Background

Large-scale energy storage has the potential to help modernize electrical power distribution. Energy storage can help manage intermittent renewable energy generation, electricity load shifting, black-start capabilities, electricity price fluctuations, and back-up power supply.

There are currently several large-scale energy storage technologies that attempt to address these modernization challenges facing the energy storage industry, including: advanced batteries; electrochemical capacitors (EC); pumped hydro; compressed air; and flywheel energy storage systems.

Due to low costs associated with lead acid batteries, they have been a popular choice for power quality and uninterruptable power supply (UPS) applications. However, the effectiveness of lead acid batteries for large-scale applications is limited by a short battery life cycle and a variable discharge rate. Li-ion batteries are often seen as an alternative or replacement for lead acid due to a longer life cycle. The effectiveness of Li-ion batteries for large scale energy storage is limited, however, by a high manufacturing cost and by security concerns associated with large-scale implementation. Metal-Air batteries are the most compact and potentially the least expensive battery to manufacture. However, the effectiveness of Metal-Air batteries is limited by a very short life cycle and low efficiency (e.g., approximately 50%). Sodium-sulphur (NaS) battery technology has shown promise as a solution for large-scale implementation. NaS batteries have high energy density but require high operating temperatures and have a relatively short life span. Battery technologies typically have an average AC to AC round-trip efficiency of approximately 64%. And, electrochemical battery technologies generally have a usable life that is degraded by the number of charge/discharge cycles.

Electrochemical capacitors (EC) are energy storage devices that have longer life cycles and are more powerful than lead-acid batteries. However, it is not feasible to implement ECs on large-scale projects due to their high cost and low energy density.

Conventional pumped hydro as an energy storage technology uses two water reservoirs that are separated vertically. An energy potential due to gravity is associated with the energy of the water travelling from the elevation of higher potential energy to the elevation of lower potential energy. During off-peak hours, electrical power is used to pump water from the lower reservoir to the upper reservoir. As demand for electrical energy increases, the water flow is reversed to generate electricity. Pumped hydro offers beneficial energy management and frequency regulation, but requires unique site requirements and large upfront capital costs.

Compressed air energy storage (CAES) uses a combination of compressed air and natural gas. A motor pushes compressed air into an underground cavern at off-peak times. During on-peak times, compressed air is used in combination with gas to power a turbine power plant. A CAES uses roughly 40% as much gas as a natural gas power plant and similarly to pumped hydro, requires unique site requirements and large upfront capital costs.

Flywheel energy storage systems have emerged as an alternative to the above-identified energy storage technologies. Flywheel energy storage systems are currently used in two primary commercial applications: UPS and power frequency regulation (FR). Both UPS and FR require extremely quick charge and discharge times that are measured in seconds and fractions of seconds. Flywheel technologies have high reliability, long service life, extremely low maintenance costs, high power capability, and environmental friendliness. Flywheel energy storage systems store energy in a rotating flywheel that is supported by a low friction bearing system inside a housing. A connected motor/generator accelerates the flywheel for storing inputted electrical energy, and decelerates the flywheel for retrieving this energy. Power electronics maintain the flow of energy into and out of the system to mitigate power interruptions, or alternatively, manage peak loads.

Often, the rotating flywheel and motor/generator rotor operate in at least a partial vacuum to reduce windage losses due to drag forces acting on the flywheel. In the case of high-voltage flywheel energy storage systems, power supplies present a raised risk of ionization and plasma formation on the windings in the motor/generator. Such plasma formation can lead to electric arc discharge. This is especially true when the motor/generator operates in a partial vacuum environment.

BRIEF SUMMARY OF THE INVENTION

Embodiments of the invention obviate or mitigate plasma formation in high-voltage flywheel energy storage systems and the associated risk of electrical arc discharge.

In one aspect of the invention, a high-voltage flywheel energy storage system is provided including a motor/generator and a flywheel located in a flywheel housing. The motor/generator can include a rotor connected to the flywheel, a stator including a motor winding, and an ionization avoidance barrier that prevents plasma formation on the motor winding by isolating the motor winding from a reduced interior pressure of the flywheel housing.

In another aspect of the invention, a method for preventing plasma formation in a high-voltage flywheel energy storage system includes providing a flywheel in a flywheel housing, drawing a partial vacuum in the flywheel housing, providing a motor/generator, the motor/generator having a stator including a motor winding and a rotor connected to the flywheel, and preventing plasma formation on the motor winding by isolating the motor winding from the partial vacuum in the flywheel housing.

In another aspect of the invention, a method for reducing electric arc discharge in a high-voltage flywheel energy storage system includes providing a flywheel in a flywheel housing, providing a motor/generator having a rotor connected to the flywheel and a stator including a motor winding, and preventing electric arc discharge from the motor winding by reducing the interior pressure of the motor/generator housing below approximately $1 \times 10^{-3}$ Torr.

In another aspect of the invention, a method for reducing plasma formation in a high-voltage flywheel energy storage system includes providing a flywheel in a flywheel housing, drawing a partial vacuum in the flywheel housing, providing a motor/generator having a rotor connected to the flywheel and a stator including a motor winding in a motor/generator housing, isolating the motor winding from the partial vacuum in the flywheel housing, and drawing a deep vacuum in the motor/generator housing, where isolating the motor winding and drawing a deep vacuum prevents ionization and plasma formation in the motor winding.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Features and advantages of the embodiments will become more apparent from the detailed description set forth below when taken in conjunction with the drawings, in which like reference characters identify corresponding elements throughout.

DETAILED DESCRIPTION

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

Figure 1:
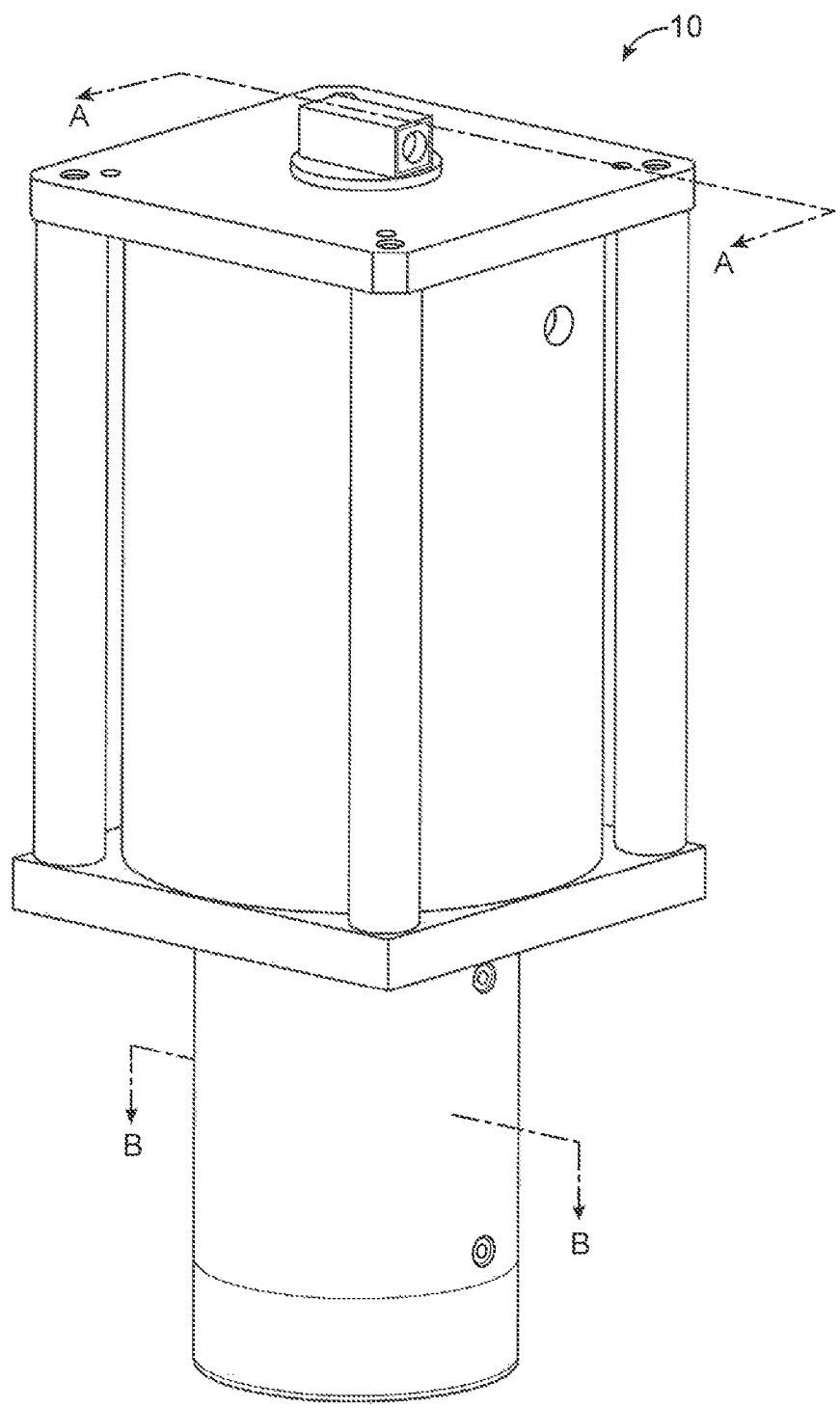
FIG. 1 is a front perspective view of a high-voltage flywheel energy storage system according to an aspect of the invention.
Figure 2:
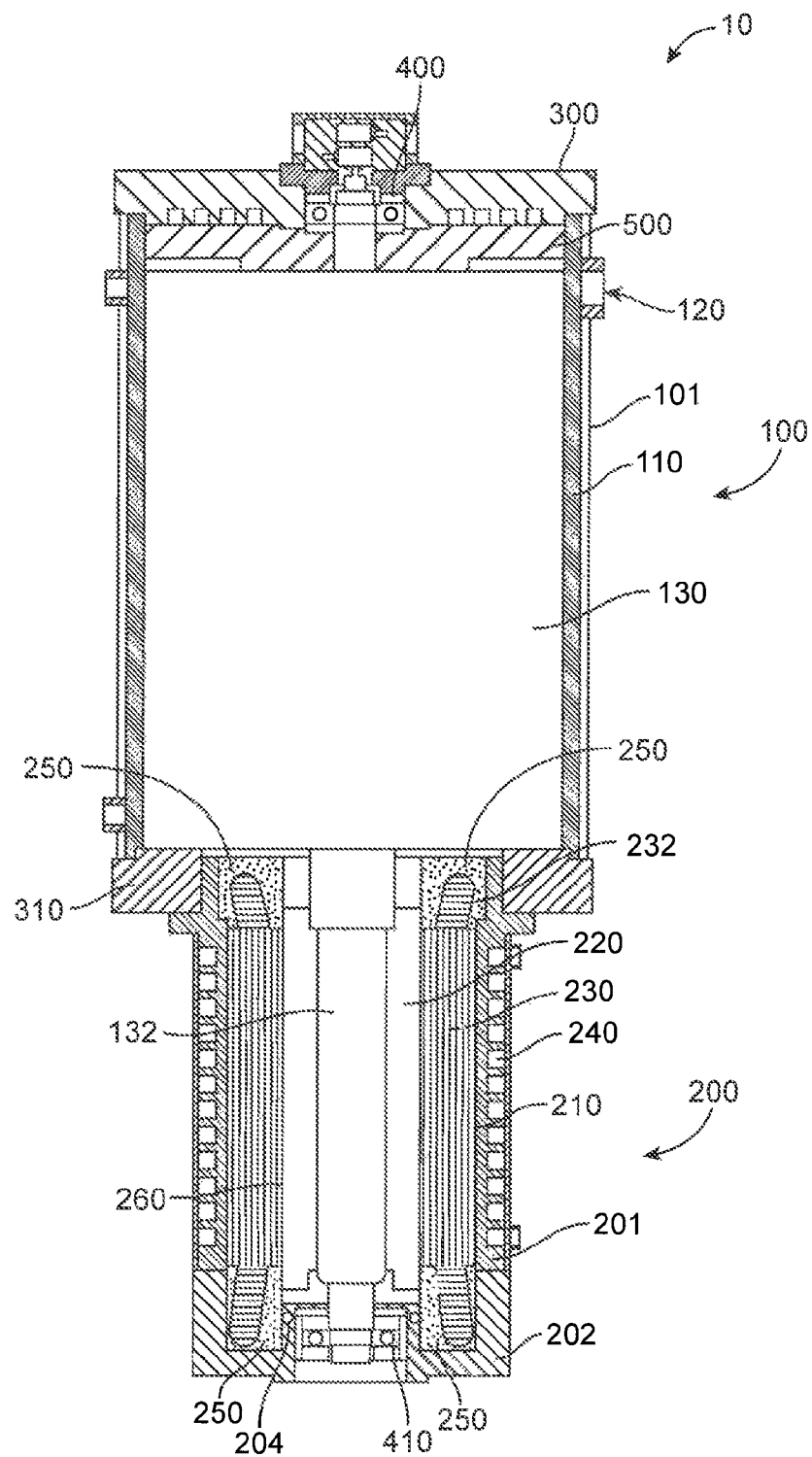
FIG. 2 is a cross-sectional view along the line A-A of FIG. 1 according to an aspect of the invention.

FIG. 1 is a perspective view of a high-voltage flywheel energy storage system 10, according to one aspect of the invention. As better shown in FIG. 2, high-voltage flywheel energy storage system 10 can include a flywheel housing 100 and a motor/generator 200. For the purposes of this description, high-voltage refers to exposing portions of the motor/generator 200 to voltages above approximately 300 volts. Flywheel housing 100 can include vacuum envelope 110 and vacuum enclosure 101 which can be supported at a first end by bottom plate 310 and at a second end by top plate 300. Flywheel housing 100 can contain a rotatably mounted flywheel 130. To reduce windage losses due to drag forces acting on flywheel 130, the interior pressure within flywheel housing 100 can be reduced. For example, the interior pressure of flywheel housing 100 can be at least a partial vacuum. So, flywheel housing 100 includes a vacuum port 120 that can extend through vacuum enclosure 101. A vacuum pump (not shown) can be connected to vacuum port 120 to remove air, gas, or vapor from vacuum enclosure 101 and vacuum envelope 110 to reduce the interior pressure within flywheel housing 100. In one aspect of the invention, the interior pressure within flywheel housing 100 can be approximately 0.01 Torr. In another aspect of the invention, the interior pressure within flywheel housing 100 can be below approximately 0.01 Torr. In another aspect of the invention, the interior pressure within flywheel housing 100 can be a deep vacuum at approximately $1 \times 10^{-3}$ Torr. In another aspect of the invention, the interior pressure within flywheel housing 100 can be a deep vacuum below approximately $1 \times 10^{-3}$ Torr. In another aspect of the invention, the interior pressure within flywheel housing 100 can be a deep vacuum at approximately $1 \times 10^{-4}$ Torr. In another aspect of the invention, the interior pressure within flywheel housing 100 can be a deep vacuum below approximately $1 \times 10^{-4}$ Torr. In another aspect of the invention, the interior pressure within flywheel housing 100 can be a deep vacuum below approximately $1 \times 10^{-6}$ Torr. In another aspect of the invention, the interior pressure within flywheel housing 100 can be a deep vacuum between approximately $1 \times 10^{-4}$ Torr and approximately $1 \times 10^{-6}$ Torr. In another aspect of the invention, the interior pressure within flywheel housing 100 can be a deep vacuum between approximately $1 \times 10^{-3}$ Torr and approximately $1 \times 10^{-6}$ Torr.

Flywheel 130 can also include a flywheel rotor 132 that extends into motor/generator 200. In one aspect of the invention, flywheel 130 and flywheel rotor 132 are made from a ferromagnetic material. Flywheel 130 and flywheel rotor 132 can be integrally formed. In an alternate aspect, flywheel 130 and flywheel rotor 132 can be fabricated separately and coupled during assembly of high-voltage flywheel energy storage system 10. Energy can be stored in flywheel 130 and flywheel rotor 132 in the form of kinetic energy.

Flywheel 130 and flywheel rotor 132 can be supported at a first end by lower mechanical bearing 410 and at a second end by upper mechanical bearing 400. Magnetic bearing 500 can act between housing top plate 300 and flywheel 130 to support a significant portion of the weight of flywheel 130. Thus, magnetic bearing 500 can relieve lower mechanical bearing 410 and upper mechanical bearing 400 from axial loading. In one aspect of the invention, magnetic bearing 500 includes a permanent magnet.

Figure 5:
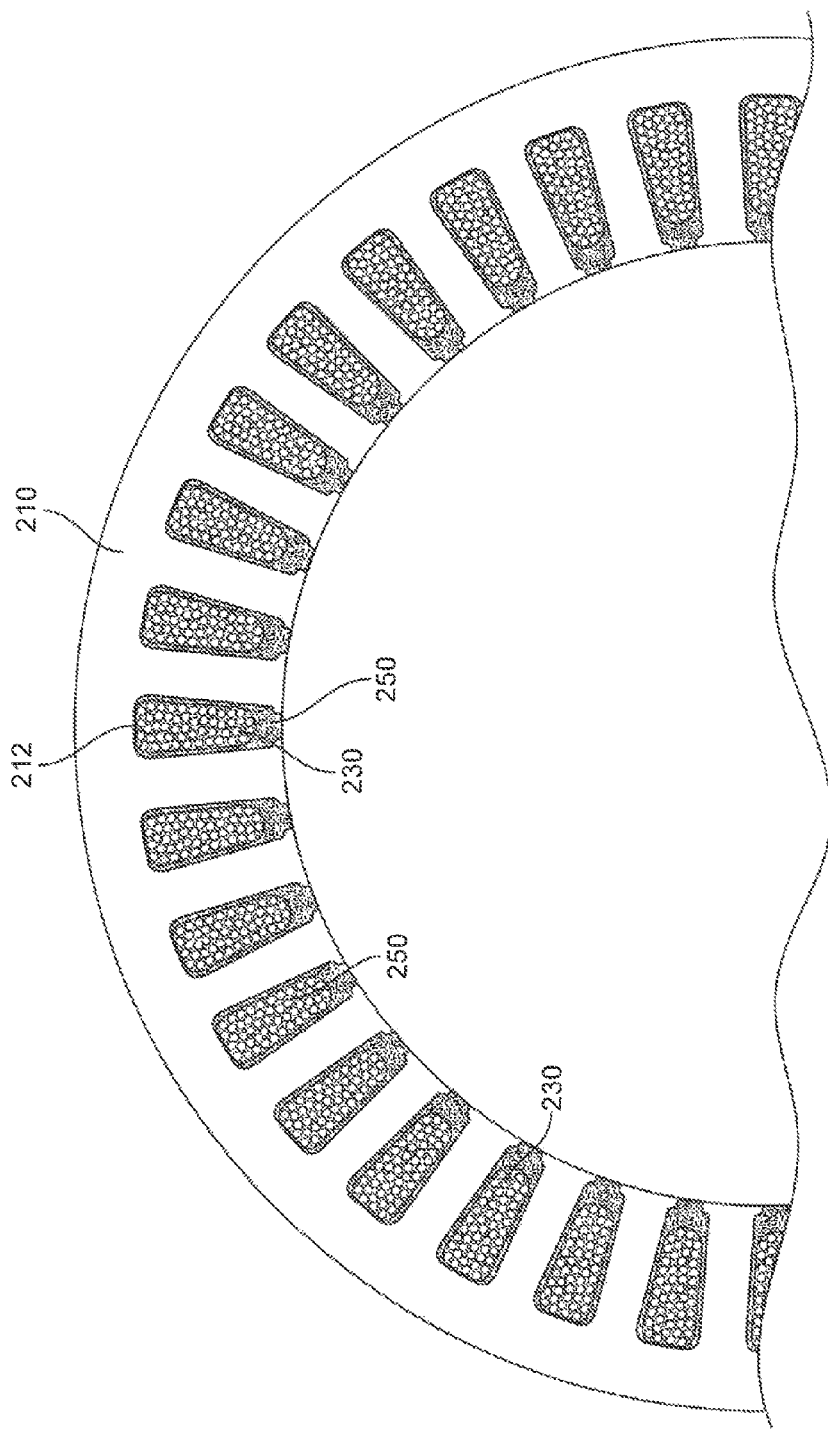
FIG. 5 is a partial cross-sectional view along the line B-B of FIG. 1 according to an aspect of the invention.

Motor/generator 200 can include motor frame 201 positioned between bottom plate 310 and motor end 202. Motor frame 201 and motor end cap 202 form a motor/generator housing which can be detachably attached to flywheel housing 100 through screws, bolts, or other suitable attachment means. In one aspect, motor/generator 200 can be an induction type motor/generator. More particularly, motor/generator 200 can be a three-phase induction type unit. Motor/generator 200 can also be a four-pole motor and can operate at approximately 400 Hz. Motor/generator 200 can include motor stator 210 and motor rotor 220. Motor stator 210 can include motor windings 230 and motor end windings 232. As shown in FIG. 5, stator 210 can include stator openings 212. Motor windings 230 extend through stator openings 212. Electrical cable connections to motor/generator 200 (not shown) can be made through motor end cap 202. The electrical cable connections provide power to motor windings 230 including motor end windings 232. Gap 260 can also be provided between motor stator 210 and motor rotor 220 to permit rotation of motor rotor 220.

In one aspect, motor frame 201 can include motor cooling channels 240 to provide liquid cooling of motor/generator 200. Motor cooling channels 240 can encircle the outer surface of motor frame 201. The coolant flow can be provided via an external pump or natural convection to remove waste heat from motor/generator 200.

Flywheel rotor 132 can be coupled to motor rotor 220. Motor/generator 200 can be capable of rotating flywheel 130 at high speed, between approximately 10,000 RPM and approximately 20,000 RPM. As flywheel 130 accelerates, the energy supplied by motor/generator 200 can be stored as kinetic energy. Upon reaching maximum speed, the electrical power can be disconnected. If the power is disconnected, or if additional electrical energy is required by the power grid, motor/generator 200 can be switched to a generating mode and the energy stored in flywheel 130 can drive the generator to supply electrical power. In some embodiments, the storage capacity of the high-voltage flywheel energy storage system 10 can be approximately 20 kWh. In an alternate embodiment, the storage capacity of the high-voltage flywheel energy storage system 10 can be approximately 50 kWh. In a further embodiment, the storage capacity of the high-voltage flywheel energy storage system 10 can be from approximately 1 kWh to approximately 50 kWh. The storage capacity of the high-voltage flywheel energy storage system 10 can also be greater than approximately 50 kWh. The energy storage is a function of the diameter and material density of flywheel 130 and the speed at which flywheel 130 is rotated.

In operation, power can be supplied to and from motor/generator 200 and motor rotor 220 through power conversion electronics (not shown) which can include a variable frequency drive (VFD). The VFD can be connected to the power grid, e.g. at 480 volts AC, 3 phase, and 60 Hz. In the motoring process of flywheel energy storage system 10, the VFD can draw power from the grid, rectify the AC power to DC, e.g. at 750 volts DC, and then reroute the DC power to a DC bus (not shown). The DC bus can supply power to a second VFD. The second VFD can create an AC voltage from approximately 0 volts AC to approximately 480 volts AC at a variable frequency of approximately 0 Hz to approximately 400 Hz. The rotational speed of motor rotor 220 in motor/generator 200 can be controlled by varying the frequency and voltage. For example, the second VFD can increase the speed of motor rotor 220 by increasing the frequency and voltage supplied to motor/generator 200. The second VFD reassembles the AC sine wave by switching the DC voltage on and off very quickly. As a result, the VFD produces a sine wave approximation that can have a peak to peak spike voltage of approximately two times the DC bus voltage. Thus, the motor windings 230 can experience peak voltages in of up to approximately 2000 volts. These high voltages increase the risk of ionization and plasma formation in motor/generator 200.

Alternatively, motor/generator 200 can behave as a generator by utilizing inertial energy of motor rotor 220 and flywheel rotor 132 to create energy that can be supplied back to the grid through the power conversion electronics. In the generating process of flywheel energy storage system 10, motor/generator 200 can supply AC power to the second VFD which can rectify the AC power to DC for routing along the DC bus. The DC bus can then supply the power to the first VFD which can convert the power back into AC for transfer to the grid.

Motor/generator 200 can operate at high generator voltages, for example above approximately 300 volts. In one aspect of the invention, motor/generator 200, including motor windings 230 and motor end windings 232, can be exposed to voltages from approximately 300 volts to approximately 2,000 volts. In particular, motor/generator 200, including motor windings 230 and motor end windings 232, can be exposed to voltages between approximately 300 volts and approximately 690 volts. And, motor/generator 200, including motor windings 230 and motor end windings 232, can be exposed to a number of voltages, including approximately 300 volts; approximately 400 volts; approximately 440 volts; approximately 460 volts; approximately 480 volts; approximately 600 volts; and approximately 690 volts.

Figure 6:
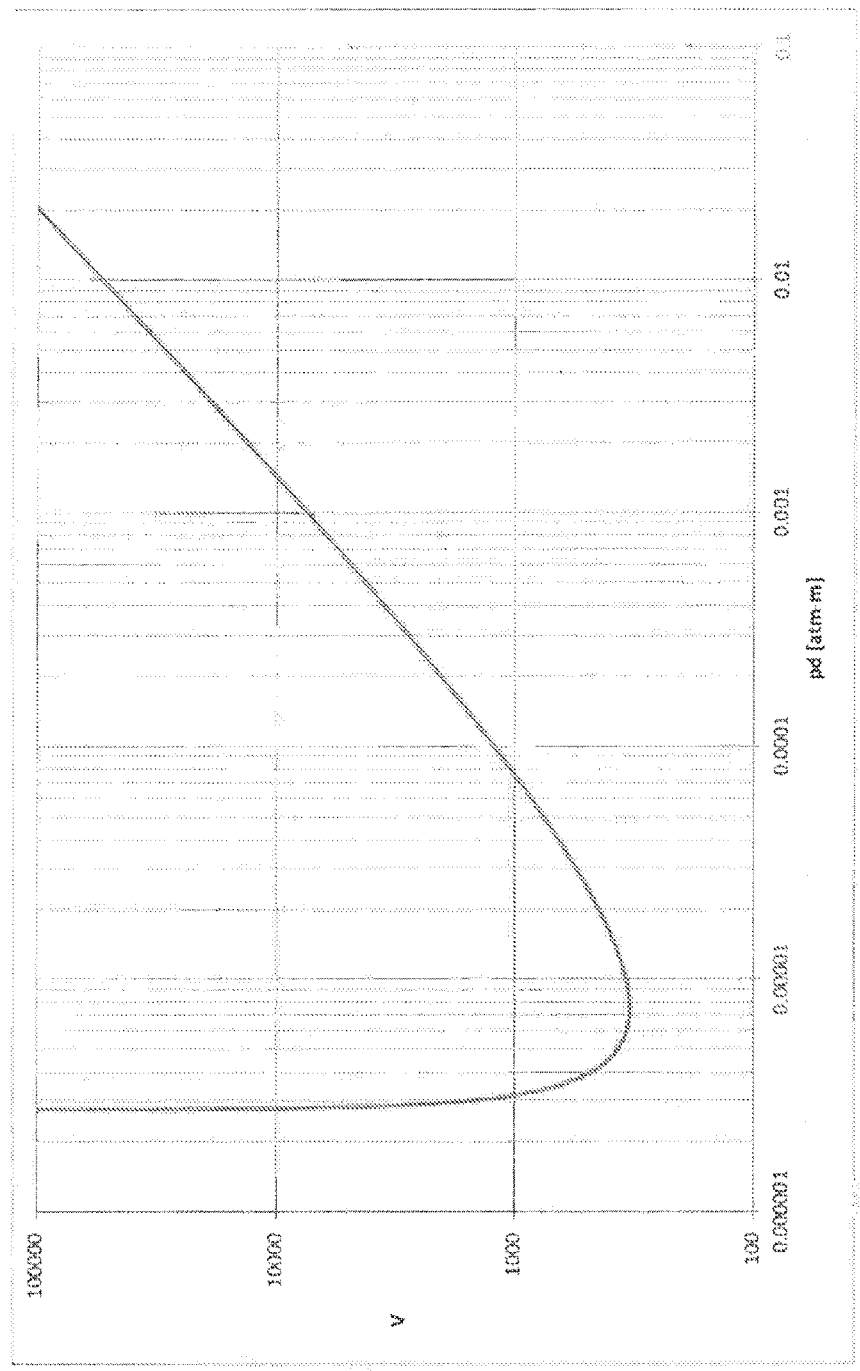
FIG. 6 is a diagram showing Paschen's Law in air with breakdown voltage on the y-axis and gap distance on the x-axis.

The exposure of motor/generator 200, including motor windings 230 and motor end windings 232 to high voltage presents a risk of ionization and plasma formation. Plasma formation can be caused by the presence of a high-voltage electric field around energized motor winding conductors. If the electric field extends into a region where air, gas, or vapor molecules are present in a partial vacuum environment, ionization of the molecules can occur resulting in plasma formation. The hot plasma can burn through the motor winding conductor insulation and can cause a ground fault and/or permanent damage to motor windings 230 and flywheel energy storage system 10 leading to premature equipment failure. Plasma formation can lead to electric arc discharge. Electric arc discharge can be harmful to motor windings 230 and flywheel energy storage system 10 and can cause power loss, audible noise, electromagnetic interference, and insulation damage As discussed above, flywheel housing can operate in a partial vacuum environment. The coupling of flywheel 130 and flywheel rotor 132 to motor rotor 220 results in a fluid channel forming between flywheel housing 100 and motor/generator 200. Thus, motor windings 230 and motor end windings 232 can be exposed to the partial vacuum in flywheel housing 100. FIG. 6 depicts the breakdown voltage required to form an electric arc on the y-axis and the product of pressure and distance on the x-axis. The curve illustrates the variation of breakdown voltage in air versus pressure and gap distance. The relationship between breakdown voltage and air pressure for a particular gap distance is governed by Paschen's Law:

$$V = \frac{a(pd)}{(\ln(pd) + b)},$$

where V is breakdown voltage; p is pressure; d is the gap distance; and a and b are constants that depend on the gas composition. As shown in FIG. 6, Paschen's curve passes through a minimum breakdown voltage in air of approximately 327 volts at 1 atmosphere of pressure. So, at this voltage and pressure, electrical arcing could occur in a flywheel energy storage system over a gap distance of approximately 7.5 μm between electrical components, e.g. from a motor winding to ground or to an adjacent motor winding. As shown by the small 7.5 μm gap, high-voltage flywheel energy storage system 10 is not at risk for electrical arcing at ambient air pressure, 1 atm.

At pressures below atmosphere, high-voltage flywheel energy storage systems, such as high-voltage flywheel energy storage system 10, have a significant risk of ionization, plasma formation, and electrical arcing from the motor windings 230 and motor end windings 232 to other components within motor/generator 200. The present invention isolates motor windings 230 and motor end windings 232 from the partial vacuum in flywheel housing 100 to prevent ionization, plasma formation, and electrical arc discharge.

Figure 3:
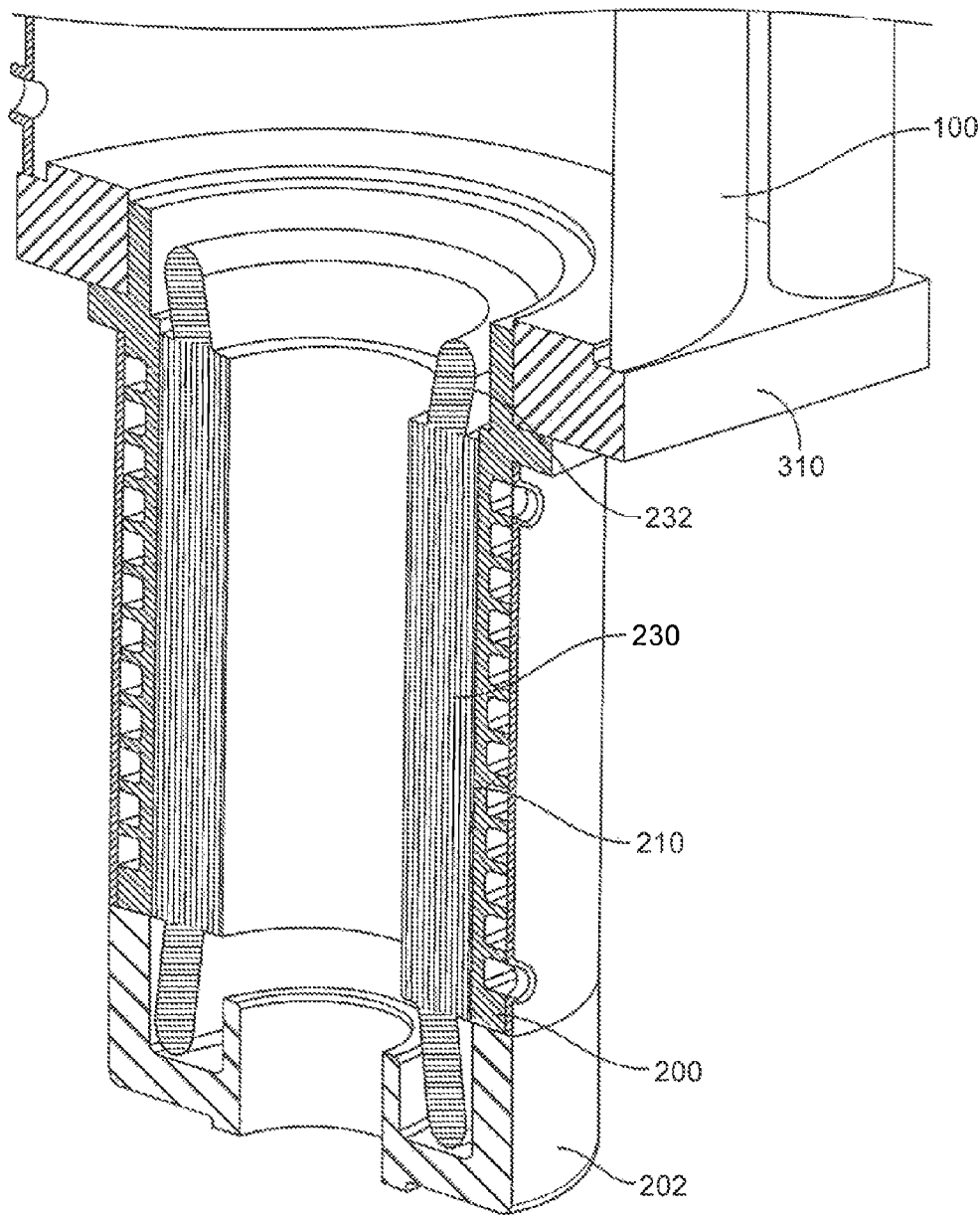
FIG. 3 is partial cross-sectional view along the line A-A of FIG. 1 according to an aspect of the invention.
Figure 4:
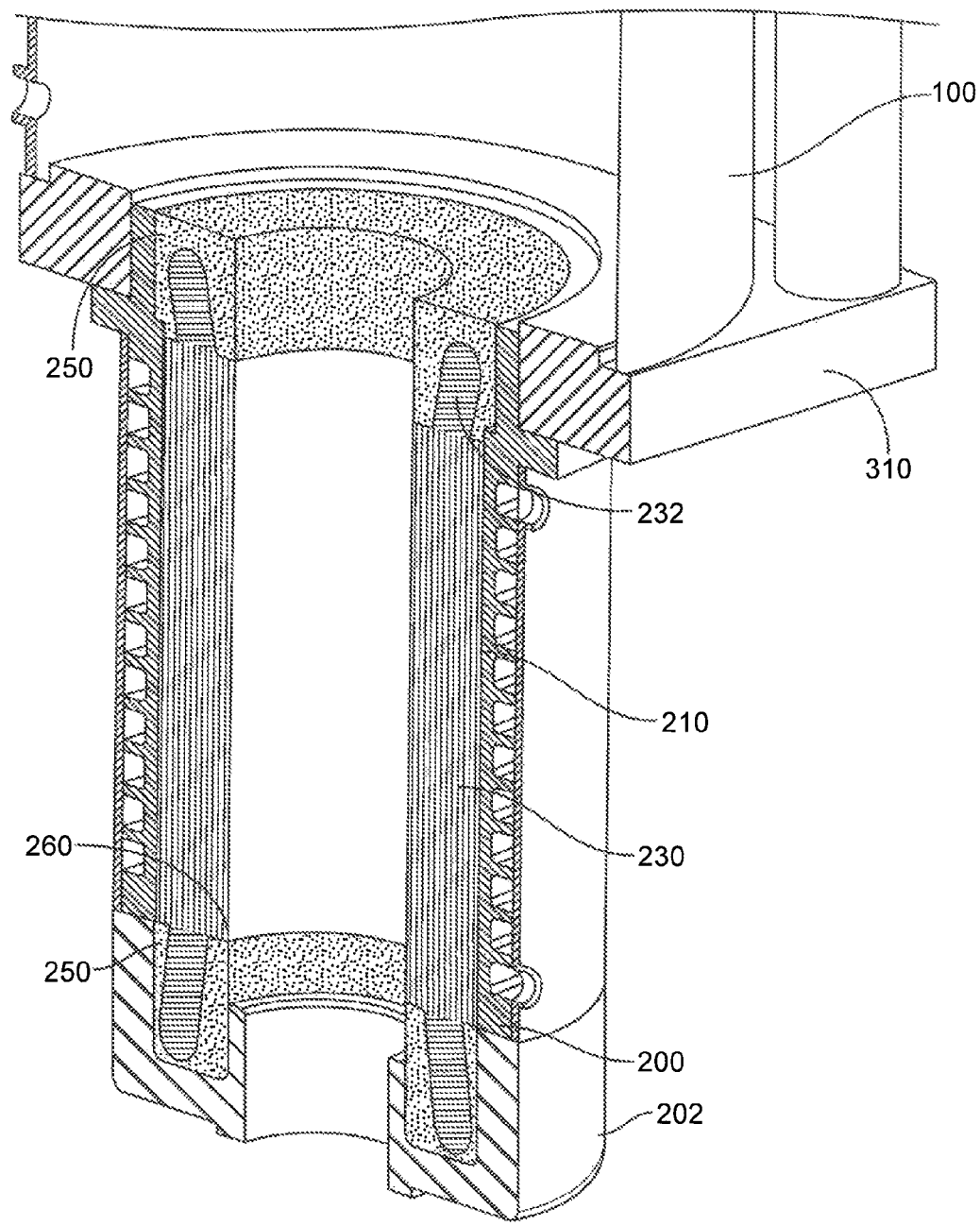
FIG. 4 is partial cross-sectional view along the line A-A of FIG. 1 according to an aspect of the invention.

In one aspect of the invention, ionization, plasma formation, and electrical arc discharge can be prevented in motor/generator 200 by utilizing motor winding encapsulant 250 to isolate motor winding 230 and motor end winding 232 from the partial vacuum in flywheel housing 100. FIG. 3 depicts motor winding 230 and motor end winding 232 prior to the addition of motor winding encapsulant 250. As shown in FIGS. 4-5, motor winding encapsulant 250 completely surrounds, impregnates, and seals motor windings 230 and motor end windings 232. Motor winding encapsulant 250 eliminates all air, gas, or vapor voids surrounding motor windings 230 in stator openings 212 and all air, gas, or vapor voids surrounding motor end windings 232. Because motor windings 230 and motor end windings 232 are completely isolated from all gases including air or vapor, ionization cannot occur, and plasma and electric arcs cannot form. Motor/generator 200 can thus prevent ionization, plasma formation, and electrical arc discharge at any voltage, regardless of the interior pressure of flywheel housing 100.

Motor winding encapsulant 250 can be added to motor/generator 200 according to the Ultra-Sealed Winding™ process developed by Dreisilker Electric Motors. Motor winding encapsulant 250 can also be added to motor/generator 200 according to the field winding encapsulation process described in U.S. Pat. Nos. 5,759,589 and 5,939,102 to Georges, Jr., the disclosures of which are incorporated herein by reference in their entirety.

In another aspect of the invention, a bottom portion of motor/generator 200 between motor winding encapsulant 250 and motor end cap 202 can be at ambient air pressure. ionization, plasma formation, and electrical arc discharge can be prevented in motor/generator 200 by isolating the electrical cable connections to motor/generator 200 (not shown) from the partial vacuum in flywheel housing 100 through positioning the connections in this portion of motor/generator 200 at ambient air pressure. In one aspect of the invention, o-ring seal 204 can be provided to limit the partial vacuum to the interior of motor/generator 200 allowing the interior pressure of the bottom portion of motor/generator 200 to be at ambient air pressure.

In another aspect of the invention, ionization, plasma formation, and electrical arc discharge can be prevented in motor/generator 200 by isolating motor winding 230 and motor end winding 232 from the partial vacuum in flywheel housing 100. For example, motor/generator 200 or flywheel housing 100 can include a seal to prevent the partial vacuum in flywheel housing 100 from extending into motor/generator 200. In one aspect, the seal could be a non-contact seal. In additional aspects, a magnetic liquid rotary seal, a labyrinth seal, or any other mechanical or fluidic seal. Through such a seal, flywheel housing 100 can operate at a partial vacuum interior pressure while motor/generator 200 can remain at ambient air pressure thus removing the risk ionization, plasma formation, and electrical arc discharge in motor/generator 200.

In another aspect of the invention, electric arc discharge can be prevented in motor/generator 200 by operating high-voltage flywheel energy storage system 10 at a deep vacuum, for example at or below approximately $1\times10^{-3}$ Torr, in both flywheel housing 100 and motor/generator 200. Operating high-voltage flywheel energy storage system 10 at a deep vacuum also mitigates the adverse effects of ionization and plasma formation. In another aspect of the invention, the interior pressure within flywheel housing 100 and motor/generator 200 can be a deep vacuum at or below approximately $1\times10^{-4}$ Torr. In another aspect of the invention, the interior pressure within flywheel housing 100 and motor/generator 200 can be a deep vacuum at or below approximately $1\times10^{-6}$ Torr. In another aspect of the invention, the interior pressure within flywheel housing 100 can be a deep vacuum between approximately $1\times10^{-3}$ Torr and approximately $1\times10^{-6}$ Torr. In another aspect of the invention, the interior pressure within flywheel housing 100 can be a deep vacuum between approximately $1\times10^{-4}$ Torr and approximately $1\times10^{-6}$ Torr. Creating a deep vacuum within the high-voltage flywheel energy storage system can prevent stable electric arcs from forming. For example, at $1\times10^{-7}$ Torr and 440 volts, an electric arc would occur at a gap distance between approximately 30 m and 152 m. This distance is too long for an electric arc to stably form.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A high-voltage flywheel energy storage system comprising:
   a flywheel located in a flywheel housing, wherein an interior pressure of the flywheel housing is reduced below atmospheric pressure;
   a motor/generator retained in a motor/generator housing adjacent and exterior to the flywheel housing, the motor/generator comprising:
   a rotor connected to the flywheel, and
   a stator including a motor winding; and
   an ionization avoidance barrier that prevents plasma formation in the motor winding by isolating the motor winding from the reduced interior pressure of the flywheel housing.

2. The system of claim 1, wherein an interior pressure of a portion of the motor/generator housing is equal to the interior pressure of the flywheel housing.

3. The system of claim 2, wherein the rotor resides in the portion of the motor/generator housing.

4. The system of claim 2, wherein a fluid passageway extends between the flywheel housing and the portion of the motor/generator housing.

5. A high-voltage flywheel energy storage system comprising:
   a flywheel located in a flywheel housing, wherein an interior pressure of the flywheel housing is reduced below atmospheric pressure;
   a motor/generator retained in a motor/generator housing adjacent the flywheel housing, the motor/generator comprising:
   a rotor connected to the flywheel, and
   a stator including a motor winding; and an ionization avoidance barrier that prevents plasma formation in the motor winding by isolating the motor winding from the reduced interior pressure of the flywheel housing, wherein an interior pressure of a portion of the motor/generator housing is ambient air pressure.

6. The system of claim 5, wherein an interior pressure of a second portion of the motor/generator housing is equal to the interior pressure of the flywheel housing.

7. The system of claim 6, wherein the rotor resides in the second portion of the motor/generator housing.

8. The system of claim 6, wherein a fluid passageway extends between the flywheel housing and the second portion of the motor/generator housing.

* * * * *